No. 775,666. PATENTED NOV. 22, 1904.
H. L. SHUTE & H. C. HENSCHEN.
APPARATUS FOR MOLDING CONCRETE WALLS.
APPLICATION FILED MAY 16, 1903.
NO MODEL. 2 SHEETS—SHEET 1.
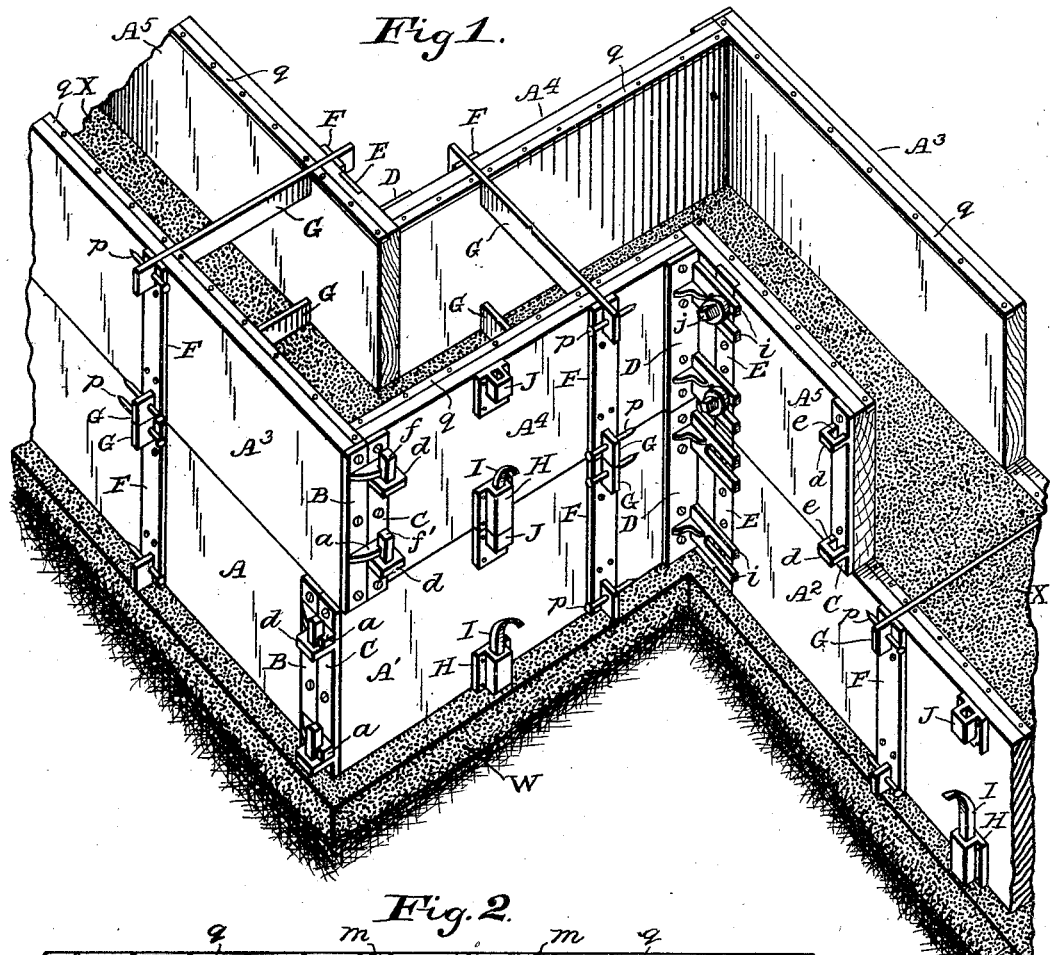
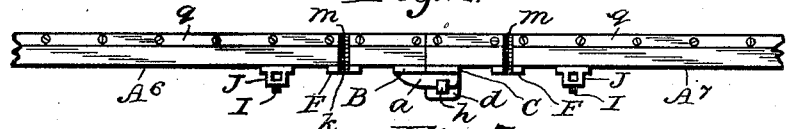
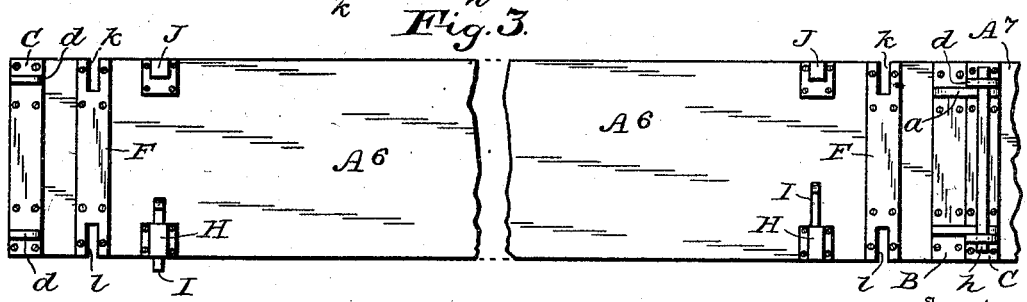
Witnesses
Wm H Payne
Stella Snider
Inventors:
Hamlin L. Shute,
Harry C. Henschen,
By E. T. Silvius,
Attorney No. 775,666. PATENTED NOV. 22, 1904.
H. L. SHUTE & H. C. HENSCHEN.
APPARATUS FOR MOLDING CONCRETE WALLS.
APPLICATION FILED MAY 16, 1903.
NO MODEL. 2 SHEETS—SHEET 2.
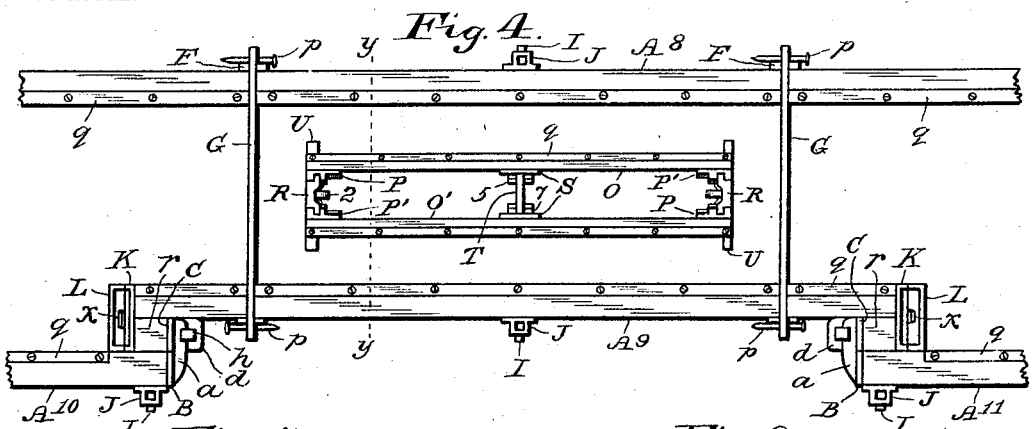
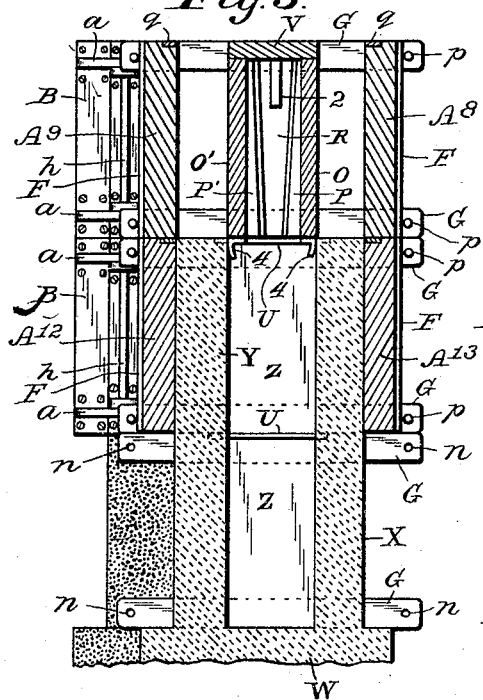
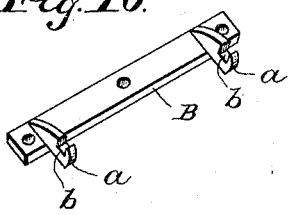
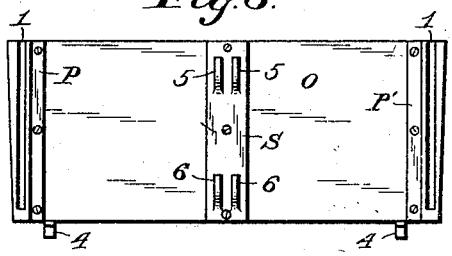
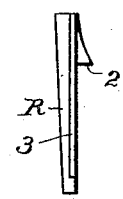
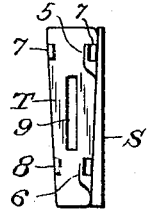
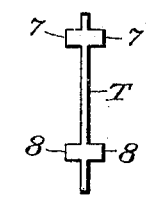
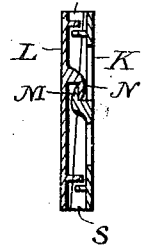
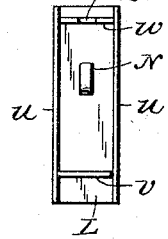
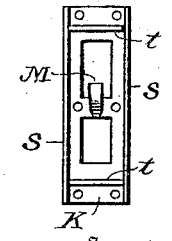

No. 775,666.                                                              Patented November 22, 1904.

UNITED STATES PATENT OFFICE.

HAMLIN L. SHUTE AND HARRY C. HENSCHEN, OF INDIANAPOLIS, INDIANA.

APPARATUS FOR MOLDING CONCRETE WALLS.

SPECIFICATION forming part of Letters Patent No. 775,666, dated November 22, 1904.

Application filed May 16, 1903. Serial No. 157,389. (No model.)

*To all whom it may concern:*

Be it known that we, HAMLIN L. SHUTE and HARRY C. HENSCHEN, citizens of the United States, residing at Indianapolis, in the county of Marion and State of Indiana, have invented new and useful Improvements in Apparatus for Molding Concrete Walls; and we do declare the following to be a full, clear, and exact description of the invention, reference being had to the accompanying drawings and to the characters of reference marked thereon, which form a part of this specification.

This invention relates to the construction of concrete walls or continuous walls made of artificial-stone composition, including hollow walls, piers, columns, and like structures; and the invention has reference particularly to the forms for molding the external and the internal surfaces of such structures, to the supports for the forms, and to the couplings for the forms, the object of the invention being to provide inexpensive apparatus which may be economically employed in building the structures above indicated.

A particular object is to facilitate the construction of concrete walls, so as to insure plumb surfaces with the least amount of work in adjusting the forms or molds.

The invention consists in improved molding-forms for the outer surfaces, gages and supports for the forms, collapsible cores, and connecting devices for the forms; and the invention consists also in the novel parts and combination and arrangement of parts, as hereinafter particularly described, and pointed out in the appended claims.

Referring to the drawings, Figure 1 is a fragmentary perspective view of portions of the apparatus in connection with a wall in course of construction; Fig. 2, a fragmentary top plan of two connected plane forms; Fig. 3, a fragmentary front elevation of two connected plane forms; Fig. 4, a top plan view showing plane and offset forms and also a collapsible core for forming hollow walls, the several elements being in positions relatively arranged for forming the wall; Fig. 5, a transverse sectional view of a wall that may be formed by the apparatus shown in Fig. 4, taken as on the line $y$ $y$ therein and showing the apparatus connected therewith; Fig. 6, a front elevation of a side of the collapsible core; Fig. 7, a side elevation of an end of the core; Fig. 8, a front elevation of the key and a side elevation of one of the coupling-plates for the key connected thereto which are employed in connection with the core; Fig. 9, a side elevation of the key; Fig. 10, a perspective view of a form-coupler part; Fig. 11, a transverse vertical sectional view of releasing devices for forms that may be employed between two offsets or pilasters; Fig. 12, an inside elevation of the wedge or removable portion of the releasing devices; and Fig. 13, an inside elevation of the stationary portion of the releasing devices or the part that is designed to be fixed to the form.

Similar reference characters indicate corresponding parts or elements in all the figures of the drawings.

In practically carrying out our invention we may employ forms of various lengths for molding the walls or other structural forms, depending upon the lengths of plane surfaces to be constructed, as will be understood from a description of the various modifications of the forms.

The forms, as A A', &c., are composed of planks of uniform thickness and width, and it is designed that two tiers of forms are to be employed, the lower tier to be transferred repeatedly to become the upper tier as the building progresses, the walls being kept level by reason of the forms being of uniform height and being first leveled on the foundations. The forms are fitted with suitable devices, varying somewhat to suit the conditions under which the forms are to be used, such as the relative positions indicated for the forms A A' $A^2$ $A^3$ $A^4$ $A^5$ $A^6$ $A^7$ $A^8$ $A^9$ $A^{10}$ $A^{11}$ $A^{12}$ $A^{13}$.

The couplers for connecting the ends of two adjacent forms, as $A^6$ and $A^7$, comprise parts B and C, adapted to be connected together. The part B consists of a cast-metal plate provided with laterally-projecting lugs $a$, having each a recess $b$. The part C consists of a like plate provided with ears $d$, having each an aperture $e$. The parts may be designed either as right-hand or left-hand types, and the plates are secured to the outer faces of the ends of the forms, so that the lugs will be adjacent to the ears and the recesses $b$ in alinement with the apertures $e$, suitable keys $f$ and $f'$ or $h$ being inserted in the apertures and recesses to complete the connections, the longer keys $h$ being preferable. At corners, as in connecting the forms A and A' or the forms $A^3$ and $A^4$ together, either one of the coupler parts may be secured against the end of one of the forms, while the other coupler part may be secured against the outer face of the adjacent form. In connecting the forms, as A' and $A^2$ or $A^4$ and $A^5$, in angles plates D are secured to the outer faces of the forms at one side of the angle at the ends of the forms, and the plates have slotted lips $i$, extending against the outer faces of the adjacent forms, which have plates E set into their outer faces, so as to be flush therewith, the plates receiving suitable screws $j$, that extend through the slots in the lips and bind the lips to the plates E.

The forms, as $A^6$ $A^7$ and the like, are provided with one or more metallic plates F, that are secured to their outer faces, extending from top to bottom thereof. The upper end of each plate has a slot $k$, extending down a suitable distance from the end, and the lower or opposite end has a like slot $l$ therein extending toward the other slot a suitable distance, and the distances between the bottoms of the two slots in all the plates are uniform. The forms likewise have slots $m$ in the upper and lower edges corresponding to the slots in the plates.

For supporting and gaging the forms, as A, &c., metallic bars G of uniform dimensions are employed, the lengths of which, however, may be different, depending upon the thickness of wall to be built. Each bar G has a pair of pin-holes $n$ near the ends thereof of uniform distance apart to receive pins $p$, which may be composed of wire nails, as a matter of economy. The bars are of suitable dimensions to fit neatly into the slots $k$, $l$, and $m$ and when placed therein will serve as gages governing the height of the forms, which may be dressed off should they swell from moisture while in use.

The tops of the forms, as A, are provided with face-plates $q$ at the inner edges thereof for protecting the wood against injury by contact of the tools of the builders.

Each form, as A, is provided on the front face thereof with a suitable number of matching-bolts and keepers for holding the upper and lower tiers or courses of forms together in the same plane vertically. Each bolt comprises a case H, attached to the form, and a vertically-movable latch-bolt I, adapted to be projected downwardly beyond the bottom of the form, all the bolts being situated at the lower portions of the forms and the keepers at the upper portions of the forms above the bolts. The keepers J each consists of a plate secured to the form and having an eye adapted to receive the bolt I of the adjacent form.

For building walls having small projecting portions the form $A^9$ is employed and it is provided with releasing devices, each comprising a wedge-holder K and a wedge L. Filling-blocks $r$ are secured to the outer faces of the form, and the holders K are secured to the ends of the form and also to the blocks $r$. Each holder K comprises a plate (cored out) having side ribs $s$, the faces of which are inclined, and having also transverse ribs $t$, the upper one of which serves as a guide for the wedge. The holder is provided with a centrally-disposed lug M, projecting therefrom. Each wedge L comprises a plate having side ribs $u$, the faces of which are inclined to correspond to the inclination of the ribs $s$, but in opposite angles, so that when the ribs are in contact the outer faces of the two plates will be parallel. The wedge is provided with a lug N, adapted to engage the lug M, and it also has transverse ribs $v$ and $w$, the former serving as a guide to coöperate with the ribs $s$, and the rib $w$ has a notch $x$ therein, through which a hook may be inserted to engage the rib $w$ for withdrawing the wedge.

For forming hollow spaces for various purposes in the walls a collapsible core is employed, which comprises two parallel side forms O and O' of identical form, having slideways P P' at their ends, removable ends R in the slideways, coupling-plates S, attached to the forms, and a key T removably connected to the coupling-plates. The forms O O' are longer at their tops than at their bottoms, their ends being slightly inclined, so as to be easily withdrawn from the concrete. The slideways P P' have grooves 1 and are inclined, so as to readily release the ends R, which are wedge-like, and have ribs 3, fitting into the grooves 1. The outer faces of the ends R are inclined also, so as to readily draw from the concrete, and the inner faces of the ends have lugs 2 for lifting purposes. The bottoms of the forms O O' are provided with guides 4, which project below the outer faces thereof. The outer faces of the coupling-plates S are inclined and they are provided with lugs 5 at their upper portions and lugs 6 at their lower portions. The key T has ears 7 and 8, adapted to engage the lugs 5 and 6, and thus lock the forms O and O' together, the key having an aperture 9 to receive a lifting-hook. The forms O O' have in some cases face-plates $q$ to protect their tops, although it is preferred to employ a removable top V, extending over the forms O O' and ends R, the top being suitably adapted to fit thereon without liability to accidental dislodgment. In supporting the core thin metallic strips U are employed, which are placed on the concrete, so as to extend across the space Z, formed by the core.

It will be obvious that various ornamental forms or moldings may be attached to the inner faces of the forms A, &c., so as to produce imitations of cut stone on the outer faces of the walls.

In practical use after a foundation W may have been laid, the bars G should be laid across the foundation and leveled, after which a course of the forms may be set upon the foundation if the same be broader than the wall is to be built or upon the bars G, the slots $l$ receiving the bars. Then other bars G may be placed in the slots $k$ and $m$, after which the pins $p$ may be inserted in the holes $n$ against the plates F, the forms being spread apart and properly set in line. The concrete may then be put in and rammed in the usual manner, filling the forms, as in Fig. 1. The second course of forms may then be placed upon the lower course of forms, as in Fig. 1, the bars G and pins $p$ being applied as before, and the bolts I inserted in the keepers J, and the keys $h$ or $f f'$ being connected to the couplers B and C. The concrete mass may now be carried up to the top of the second course of forms, and by this time the concrete in the lower forms will have set sufficiently to permit the lower forms to be removed and placed upon the upper course, as before. When removing the lower forms, the bolts I, the coupling-keys $h$ or $f f'$, and the pins $p$ should be withdrawn, after which the forms may be drawn out horizontally from under the upper course, the upper course being supported by the bars G under them in the slots therein. In a case as illustrated in Fig. 1, the form A will first be removed, then the form A' and then the form $A^2$, as will be obvious, the screws $j$ having first been removed. As illustrated in Fig. 5, the forms $A^8$ and $A^9$ have been removed from under and placed upon the forms $A^{12}$ and $A^{13}$ ready for further building up of the wall.

In cases such as are illustrated in Fig. 4, after filling the forms with concrete and the same has set somewhat the wedges L are to be withdrawn before setting up the next top course of forms, so that when the top course is filled the lower forms may be readily withdrawn without binding at their ends.

When it is desired to form the hollow spaces in the walls X, the collapsible core may be set on the foundation, suitable recesses being cut therein to receive the guides 4, and then when the wall is carried up to the top of the forms and the core and the concrete partially set, the top V may be removed and ends R and the key T may be withdrawn, thus releasing the forms O O', which when removed will leave the space Z. Then when the next upper forms are set the strips U should be laid across the space Z and the core may be set upon the strips and the building continued, forming the next wall course Y, the strips U being left in their places, or being flexible may be bent and withdrawn, if desired. After removing the forms A, &c., from beneath the upper courses the bars G may be easily driven out of the walls and the openings formed by them may be filled in by workmen from above with concrete, although as it is designed that the bars G be extremely thin the openings left after their removal may not be objectionable.

It will be observed that by reason of the bars G, the pins $p$ and plates F, and the matching-bolts I the courses of forms will be self-matching, so that subsequent measurements and leveling will not be required after properly setting the first course of forms.

In the hands of the skilled mechanic many modifications in the forms will be suggested that will fairly come within the scope of the invention—such, for instance, as attaching small parts when forming sills for doors and windows and in forming the door and window openings.

Having thus described the invention, what we claim as new is—

1. Apparatus, for molding concrete walls, including forms provided each with gage-plates having each pair of slots extending from the ends thereof, matching-bolts at edges of the forms, keepers at opposite edges of the forms, coupling devices at the ends of the forms, and gage-bars for coöperation with the gage-plates.

2. Apparatus, for molding concrete walls, including forms provided with gage-plates having each a slot in the top thereof and having recesses in the tops thereof, gage-bars in the slots and the recesses and having their tops flush with the tops of the forms, matching-bolts and keepers at opposite edges of the forms, and coupling devices at the ends of the forms.

3. Apparatus, for molding concrete walls, including forms provided with rigidly-attached gage-plates having slots therein, gage-bars in the slots having pins coöperating with the plates, inner corner-couplings comprising plates having lateral slotted lips and plates having screws extending through the slots in the lips, the plates being secured to adjacent forms.

4. Apparatus, for molding concrete walls, including forms for the outer surfaces, supports and gages for the forms, and collapsible cores between the forms comprising opposing side forms, keys holding the side forms together, and wedge-shaped ends inserted between the side forms.

5. Apparatus, for molding concrete walls, including forms provided at the upper and lower edges thereof with movable matching-bolts and keepers for receiving the bolts, couplings coöperating with the ends of the forms, and means whereby the forms may be prevented from spreading apart.

6. Apparatus, for molding concrete walls, including forms provided with wedge-holders at the ends thereof, wedges mounted in the holders, and coupling-plates having lugs attached to the forms adjacently to the wedge-holders.

7. In apparatus for molding concrete walls, the combination of forms provided each with a gage-plate, a coupling device and a pair of matching devices at or near each end thereof, the gage-plates having slotted ends and the forms having recesses at the slotted ends of the gage-plates, and gage-bars for coöperating with the slotted ends of the gage-plates.

8. In apparatus for molding concrete walls, the combination of forms having face-plates at the upper inner edges thereof, coupling-plates at the ends of the forms, keys coöperating with the coupling-plates, matching-bolts and keepers attached to the forms, and gage-bars supporting the forms at the tops and bottoms thereof.

In testimony whereof we affix our signatures in presence of two witnesses.

HAMLIN L. SHUTE.
HARRY C. HENSCHEN.

Witnesses:
WM. H. PAYNE,
E. T. SILVIUS.